Patented Jan. 13, 1931

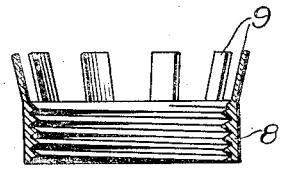
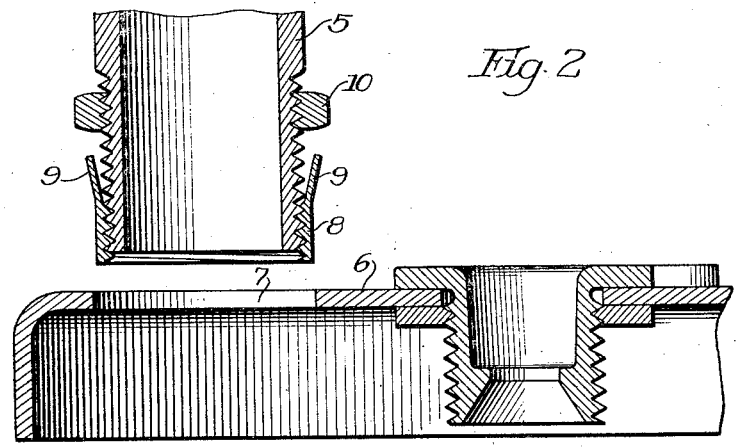
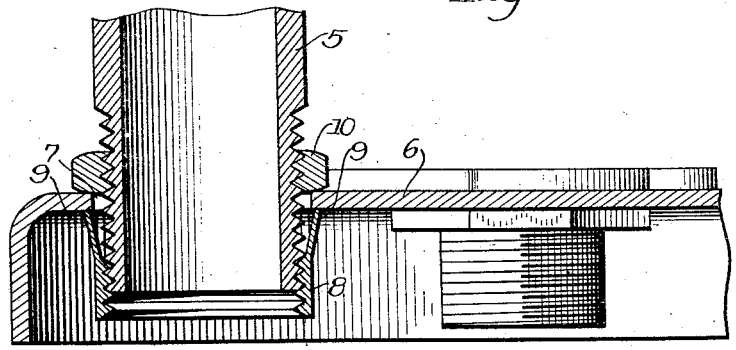

1,788,612

UNITED STATES PATENT OFFICE

DEWEY J. BENSON, OF CHICAGO, ILLINOIS

BUSHING

Application filed May 11, 1928. Serial No. 276,968.

This invention relates to improvements in conduit fittings and more particularly to a device for securing the end of an electrical conduit in an outlet or switch box while a wall is being formed around the box.

The object of the invention is to provide a new and improved device for the above purpose which is simple and inexpensive to construct, which can be attached conveniently to the end of a conduit and operatively associated with a switch or outlet box and which securely holds the conduit in position during the formation of a wall around the box, at the same time permitting removal of the box even after it has been completely encased in hardened concrete or other wall material.

Other objects and advantages of the invention will become apparent from the following detailed description taken in connection with the accompanying drawings in which—

Figure 1 is a sectional view taken along a plane through the longitudinal center line of a bushing embodying the features of the present invention.

Figs. 2 and 3 are sectional views of an outlet box and a conduit pipe illustrating the use of the present invention associated therewith.

While I have illustrated in the drawings and will describe herein the preferred embodiment of the invention, it is to be understood that I do not intend to be limited thereby to the particular form disclosed but aim to cover all modifications and alternative constructions falling within the spirit and scope of the invention as expressed in the appended claim.

In the drawings the invention is illustrated in exemplary form as a means for securing the end of a rigid conduit pipe 5 in a box 6 of the kind commonly used in ceilings as a terminal outlet for electric lighting conductors. Such boxes usually have in their top wall a plurality of knock-outs which can be punched out to form holes 7 through which the end of the conduit can be extended. In practice, the boxes are usually placed upon the ceiling or other wall form and the conduits led thereto before the concrete for the ceiling or wall is poured into the form or the tile blocks arranged in place thereon, as the case may be.

The device selected for illustrating the present invention comprises generally a tubular body portion 8 and a plurality of resiliently flexible fingers 9 projecting from one end thereof. Preferably the body portion is of short length and formed internally with standard pipe threads throughout its length into which a few of the external threads at the end of the conduit 5 may be entered from the end of the body carrying the fingers 9. The outside diameter of the body is such that it may be loosely received in the knock-out hole 7 by movement of the conduit with the bushing attached thereto (Fig. 2) in an axial direction. In the use of the bushing with standard boxes, a standard external diameter can be adopted for the bushing.

In the present instance, the fingers 9 are composed of the same material as the body and project in a longitudinal direction a short distance beyond the end of the body. Any desired number of fingers may be provided, these being located at spaced points around the body and formed with squared ends terminating at equal distances from the end of the body. Relatively thin fingers are provided in the present instance so as to possess the desired degree of flexibility, at the same time being adapted to contract about the body and pass through the knockout hole 7. The fingers are so formed or treated as by tempering that they have a tendency, due to their inherent resiliency, to splay outwardly or expand away from the conduit.

To secure the end of the conduit in the box, the usual nut 10 is first placed on the conduit after which the bushing is secured to the end threads, as shown in Fig. 2, with the fingers projecting toward the nut and their ends spaced a short distance therefrom. Then by an endwise movement of the conduit the bushing is forced through the knock-out hole, the fingers 9 being engaged by the edge of the hole and contracted sufficiently to permit of such entry. After the ends of the fingers have passed the inner surface of the box wall, as determined by engagement of the nut 10 with the outer box surface, the fingers will expand automatically within the box, their ends engaging the box wall and preventing withdrawal of the conduit. Thus the conduit is effectually secured in the box against displacement while the wall is being constructed around the box as by use of concrete. The nut 10 prevents further inward movement of the conduit and is preferably tightened against the box so as to draw the ends of the fingers snugly against the inner box surface, thereby completing the assembly of the unit as shown in Fig. 3.

By employing threads as a medium for fastening the bushing onto the end of the conduit, the requirements of standard practice are complied with. Because of this means of attachment and the provision of fingers which project beyond the end of the threaded body portion, the entire bushing structure, when operatively associated with the box, is disposed inside of the box walls and no part thereof can be encased in the concrete or other material of which the building wall is constructed. It is therefore possible to conveniently remove the bushing by working from the open end of the box, thereby permitting convenient removal of the outlet box from the wall after the forms have been removed. This is often necessary in practice and with bushings heretofore employed has necessitated chipping away a portion of the hardened concrete or other wall material and a mutilation of the outlet box and the end of the conduit, thereby making replacement of the box difficult.

I claim as my invention:

A means for securing an electrical conduit having an externally threaded end into an outlet box comprising a device adapted to be secured to the threaded end of a conduit and operable automatically upon insertion of the conduit end with the device attached thereto through a knock-out hole in said box to expand and engage the internal surface of the box, said device when thus expanded being disposed wholly within said box and removable from the conduit from a point within said box.

In testimony whereof, I have hereunto affixed my signature.

DEWEY J. BENSON.